April 6, 1954  L. J. M. GAMET  2,674,461
CONTROL JACK FOR WORK-CARRYING MEMBERS OF MACHINE TOOLS
Filed Nov. 26, 1951  3 Sheets-Sheet 1
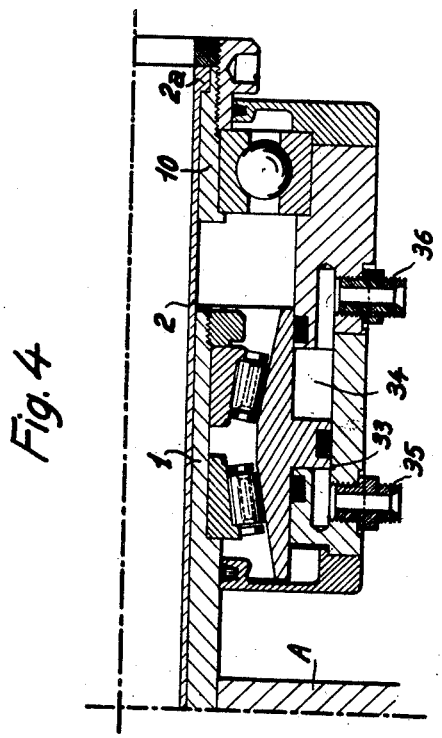
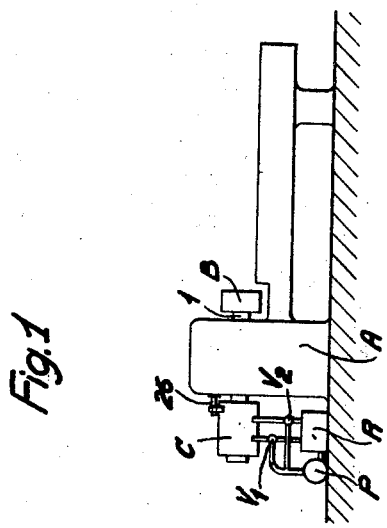
Inventor
Louis J. M. Gamet
by
Stevens, Davis, Miller & Mosher
his attorneys

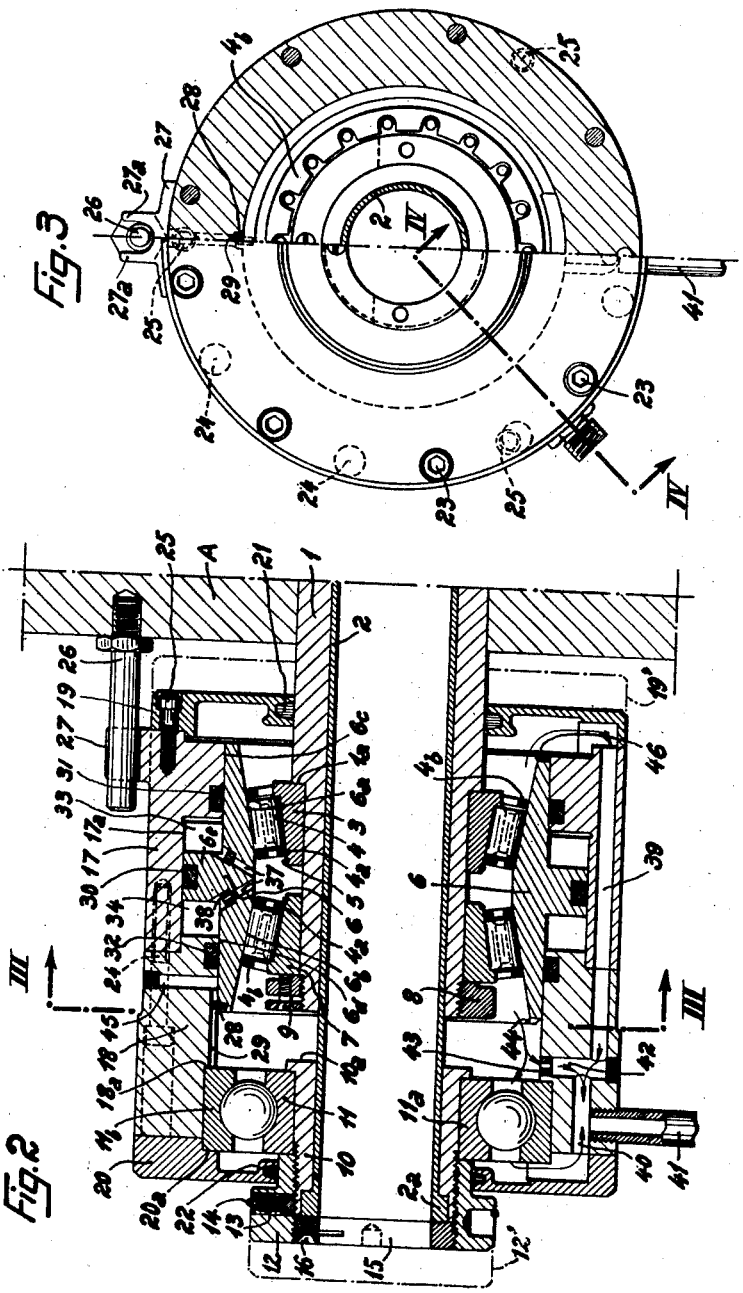

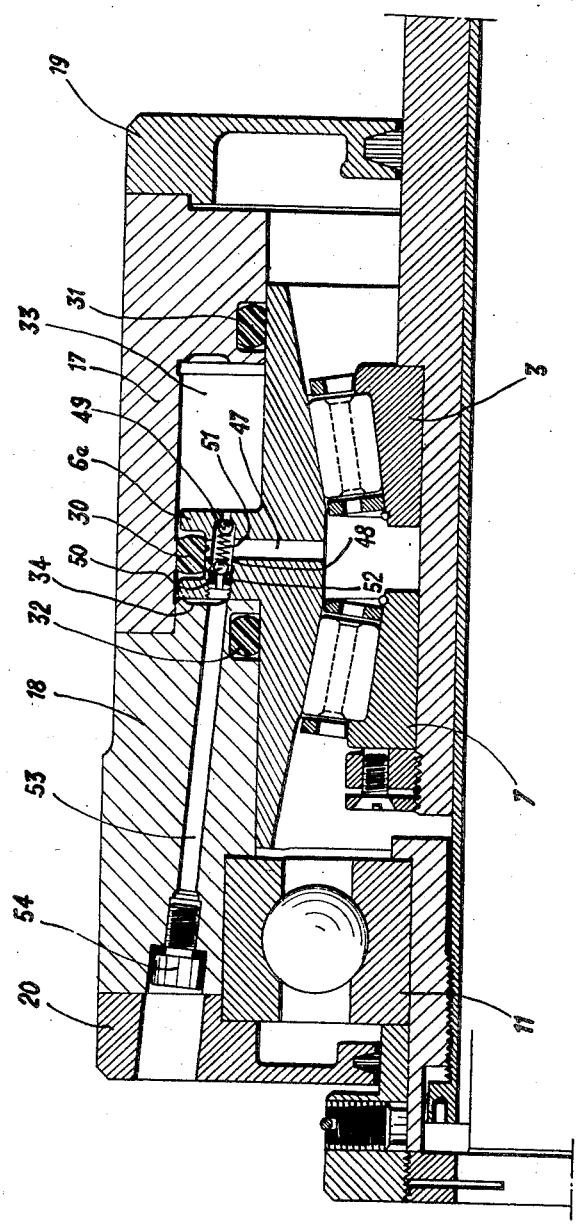

Patented Apr. 6, 1954

2,674,461

UNITED STATES PATENT OFFICE 2,674,461

CONTROL JACK FOR WORK-CARRYING MEMBERS OF MACHINE TOOLS

Louis J. M. Gamet, Bougival, France, assignor to La Precision Industrielle (Societe Anonyme), Paris, France, a company of France Application November 26, 1951, Serial No. 258,244

Claims priority, application France November 28, 1950

11 Claims. (Cl. 279—4)

It is well known that it is of interest to control, during operation, the work-carrying means of machine tools, such as machining chucks, clamping bars and the like parts carried by the spindles of such machines. In practice, the speed of the machining operations is thus accelerated and, furthermore, this cuts out the sudden variations in the driving power following the braking and restarting of said machines.

To this end, it has already been proposed to execute work-carriers which I will term hereinafter, generally speaking, "chucks," the fastening and release of which are controlled by a member coaxial with the spindle and adapted to move translationally along the axis of the latter, said member being actuated, when required, through fluid-operated jacks and adapted to be controlled from outside.

In order to cut out any axial thrust on the bearings of the spindle, it is necessary for the jack or jacks to engage the actual spindle with a view to controlling the chuck carried by the latter. It is possible to obtain thereby a more reliable operation by reason of the control of the chuck by the jack being independent of the axial clearance that may arise between the spindle and its bearings.

To this end, in the embodiments known hitherto, the jacks rotate with the spindle and consequently, it is necessary to provide for their feed through rotary joints. Now, such joints are brittle and are liable to leaks that reduce the efficiency of the jacks. Furthermore, the known jacks generally close the axial bore in the spindles so that this prevents the machining of bars of some considerable length.

My invention has for its object a non-rotary fluid-operated jack located at the end of the spindle that is opposed to that carrying the chuck and intended for the translational actuation of a member coaxial with said spindle with a view to controlling said chuck.

The jack according to my invention is constituted by an annular piston coaxial with the spindle and with reference to which the latter may revolve without being capable of sliding axially along same, said piston being associated with a cylinder extending beyond the end of the spindle remote from the chuck, so as to be connected, for translational movement therewith, with a member adapted to slide axially inside said spindle, through the agency of a thrust bearing.

The piston and the cylinder may be held fast against rotation while the admission of fluid into the jack shifts the cylinder with reference to the piston and leads to a corresponding translational movement of the sliding member inside the spindle, which member may revolve with the latter.

The sliding member is preferably tubular so as to leave, axially of the spindle, a free channel that allows the machining of very long bars.

In a preferred embodiment of my invention, the cylinder encloses two compartments lying to either side of the piston, which compartments may be submitted to pressure in alternation. I thus obtain a jack adapted to exert, in both directions, a stress on the sliding member, which allows clamping and releasing the chuck connected with said tubular member.

The jack, according to my invention, may be actuated through any fluid under pressure, whether liquid or gasiform, but it is, however, preferable to resort to oil.

In this case, and in accordance with an advantageous feature of my invention, the lubrication of the thrust bearings, both for the piston surface engaging the spindle and for the cylinder surface engaging the sliding member, is provided through a tapping of oil under pressure that is sent into the jack compartments. It is thus possible to obtain, through a circulation of oil, a highly efficient lubrication of the different rotary members of the jack.

The following description, given by way of example and by no means in a binding sense, and accompanying drawings referring to the same embodiment, will allow ascertaining how my invention may be executed in practice, the features appearing both in the drawings and in the specification, forming obviously part of the invention, insofar as they are defined in accompanying claims. In said drawings:

Fig. 1 is a diagrammatic elevational view of a machine tool equipped with a jack in accordance with my invention.

Fig. 2 is a longitudinal cross-section through a vertical plane of a jack according to my invention.

Fig. 3 is, in its left hand part, a half view of the jack seen endwise and, in its right hand part, a half section through line III—III of Fig. 2.

Fig. 4 is a cross-section through line IV—IV of Fig. 3.

Fig. 5 is a partial cross-section of a jack similar to Fig. 2 including means for adjustably removing oil for the lubrication of the movable part of the jack during operation.

Turning to Fig. 1, the machine tool A includes a rotary spindle 1, one of the ends of which carries a work-carrying chuck or the like arrangement B while the other end carries the jack C forming the object of the invention and that serves for the operation of the chuck. Said jack is controlled through the three-way cocks V-1, V-2 adapted to be operated simultaneously by a pump P, communicating with a container R collecting the oil after operation.

As readily apparent from inspection of Fig. 2, a tubular member 2 controlling the operation of the chuck, may slide inside the axial bore of the spindle 1.

Against the shoulder 1a of the spindle is keyed the inner race 3 of a conical roller bearing 4. The rollers of said bearing include stub shafts the ends of which are guided by the races 4a and 4b and the whole arrangement of stub shafts and associated races is held fast over the race 3 by the annulus 5 carried by said race. The outer race for the roller bearing 4 is constituted by the portion 6a of a bore assuming the shape of a double frustocone and provided in an annular piston 6. A second conical roller bearing similar to that, 4, which has just been described and directed in opposite relationship with reference thereto, is also inserted between the piston 6 and the spindle 1. The peripheral race 6b of this second bearing receives the shape of a frustocone through the machining of the bore in the piston 6, said frustocone 6b opening in a direction opposed to that of the surface 6a while its slope is the same as that of the latter. The inner race 7 of this second conical roller bearing is adjustable and it is locked by means of a nut 8 screwed over the end of the spindle and said nut is secured in its turn in the usual manner through the screwing home of a screw 9 through a slot extending transversely to the axis of said nut.

By reason of the presence of these two roller bearings, the spindle 1 is adapted to rotate with reference to the piston 6 without, however, being allowed any axial movement with reference to said piston.

The tubular member 2 that is provided at its end with a shoulder 2a, is fitted inside a socket 10 carrying the inner race 11a of a thrust bearing 11. In the example illustrated, said thrust bearing is constituted by a ball bearing provided with deep recesses for the balls. The inner race 11a of this bearing is locked in contact with a collar 10a on the socket 10, as provided by a nut 12 screwed over the outer end of said socket, said nut being locked in its turn, when screwed home, by a clamping screw 13 which is held fast by an outer ring 14.

The shoulder 2a of the tubular member is locked inside the socket 10 by a ring 15 that is outwardly threaded and screwed inside the nut 12, while said ring is held against release by a clamping screw 16.

The outer race 11b of the bearing 11 is rigid with the jack cylinder. This cylinder includes four sections, to wit a section 17 the bore 17a of which cooperates with a rib 6e on the outer periphery of the piston 6, a section 18 forming a cover for said section 17 and lastly, two end sections 19 and 20 surrounding respectively the spindle 1 and the nut 12 rotating in unison with the tubular member 2, said sections 19 and 20 being provided with fluidtight packings 21 and 22, respectively. The outer race 11b of the ball bearing 11 is held fast between the shoulder 18a of the section 18 of the cylinder and the shoulder 20a of the section 20. The clamping of said two sections 18 and 20 against each other is provided through the studs 23 illustrated in Fig. 3 and distributed along the periphery of the section 20.

The two sections 17 and 18 are assembled together through the studs 24 arranged alternatingly with the studs 23, and the countersunk heads of which are held inside suitable openings provided in the section 18. Lastly, the cylinder section 19 is secured to the section 17 through the agency of three studs 25 that are sufficiently strong to resist the slight stresses to which said section 19 is submitted.

The cylinder considered as a whole is held against rotation by the projecting member 26 carried by the actual machine tool frame A, said projecting member engaging the interval between the lugs 27a provided on a member 27 secured to the section 17. On the other hand, the piston 6 is provided at its outer periphery with a stud 28 adapted to move inside a groove 29 provided longitudinally in the inner wall of the cylinder section 18 whereby said piston is held fast against rotation with reference to the cylinder. The stud 28 screwed into the piston may be positioned by means of a tool inserted into the radial bore 45 in the cylinder wall, after the sections of the cylinder have been assembled round the piston. The periphery of the rib 6e forming the actual operative piston is provided with a groove inside which is housed a fluidtight ring 30 cooperating with the bore 17a in the cylinder, to either side of the annular piston; the cylinder sections 17 and 18 are provided respectively inside suitable annular grooves with fluid-tight rings 31 and 32 cooperating with the cylindrical bearing surfaces 6c and 6d of the piston 6 respectively.

To either side of the piston rib 6e are thus formed two fluidtight annular chambers 33 and 34 into one of which fluid under pressure may now be admitted through the operation of the cocks V-1 and V-2 while the other compartment is open to the exhaust. As a matter of fact, the compartments 33 and 34 communicate respectively, as apparent from inspection of Fig. 4, with the fluid input nozzles 35 and 36 that are in their turn connected with the cocks V-1 and V-2.

The jack cylinder illustrated in its mean position in Fig. 2 may thus be urged towards the right hand side, the piston remaining stationary, until the cylinder section 19 enters the position 19' or towards the left hand side, until the nut 12 enters the position 12'.

In Fig. 4, the compartment 34 is supposed to be held under pressure and the compartment 33 to communicate with the discharge so that the cylinder occupies one of its extreme positions.

When the fluid is constituted by oil under pressure, it is of advantage to use part of said oil for the lubrication of the rotary and sliding parts of the jacks. To this end, each of the compartments 33 and 34 communicates through an oblique channel 37 with the space defined by the bore in the piston. The channels 37 are partly closed by plugs 38 provided with small gauged ports. Thus, the oil under pressure admitted into either of the compartments 33—34 may, at the price of a small loss of pressure, enter the inside of the jack for the lubrication of the rotary members contained therein.

The oil thus admitted into the upper end of the jack, is collected at the lower end of the latter and is exhausted through the channels 39 and 40 leading to the collecting pipe 41 returning the oil into the container R.

The channels 39 and 40 are interconnected through a section of the vertical channel 42 the upper part of which is closed by a plug 43 provided with a narrow port. A part of the oil escapes directly through said port while the remainder is constrained to pass through the thrust bearing 11 before it is exhausted through the left hand part of the channel 40.

In order to open permanently the output provided for the oil, the lower edges of the two ends of the piston 6 are recessed at 44 and 46 so that, even when the cylinder occupies either of its extreme positions, the oil may escape at both ends of the piston, either through the vertical channel 42 or through the right hand side (Fig. 4) of the chanel 39.

When the jack is to provide stresses of variable magnitude, i. e. when it is fed with oil submitted to a variable pressure, it may occur that the gauged ports provided in the plugs 38 are not sufficient for low oil pressures while they are too large in the case of high pressures so that the pipe 41 is insufficient for the exhaust of the oil passing through said ports. This produces leaks of oil, to a not inconsiderable extent, through the packings 21 and 22. In this case, the removal of oil from the jack chambers may be adjustable, and this is preferably provided in the manner illustrated in Fig. 5.

In said Fig. 5, the channels 37 of the first embodiment are united so as to form a single radial channel 47 shown as communicating with an oblique bore 48 extending across the piston rib 6e; said oblique bore contains two balls 49 and 50 that are urged apart and against corresponding seats in the bore, by a spring 51. A threaded plug 52 provided with a narrow port and engaging said bore 48, forms the actual seat for one of the balls 50 and allows adjusting the pressure of the spring 51 when it is shifted inside the bore 48 while the ball 49 rests on a seat formed at the bottom of the bore 48. The slot on the plug 52, for engagement by an elongated screw-driver adapted for the screwing and unscrewing of said plug 52, may be reached through an oblique bore 53 provided in the cylinder section 18, said oblique bore being normally closed by a plug 54.

In order to provide for adjustment under predetermined pressure conditions, the cylinder compartment 33 is submitted to pressure so as to set the bores 48 and 53 in alignment. As the compartment 34 is not submitted to pressure, the plug 54 may be removed so as to allow acting on the plug 52 through an elongated screw driver; thus, it is possible to screw down or to release said plug until the flow of oil through the pipe 41 becomes normal. To allow checking said flow, it is preferable for the exhaust pipe 41 to be made of transparent plastic material. As the spring 51 exerts equal forces of opposite directions on the two balls and as the ports in the seats of the two balls 49 and 50 have equal diameters, the adjustment made serves equally well whatever compartment 33 or 34 be submitted to pressure.

It will be noticed that the adjustment is made easy by reason of the fact that this adjustment is performed when the cylinder abuts against a stop at the end of its stroke under the pressure of the oil inside the compartment 33, and the compression of the spring 51 is consequently adjusted as a function of this pressure. This cuts out any unnecessary attempts by trial and error. Lastly the small size of the compartments 33 and 34 and also the small losses of oil pressure allow using the lubricating oil pump providing for the circulation of oil inside the machine as a jack-feeding pump. In this case, an auxiliary pump is unnecessary and the pipe 41 may return the lubricating oil towards the points of the machine that are to be lubricated. The equipment of extant machine tools with a hydraulic control system for the work-carrying chuck, is thus considerably simplified.

Obviously, many modifications may be brought to the jack that has just been described and, in particular, any desired substitution of technically equivalent means for any part of the arrangement may be made without this unduly widening thereby the scope of the invention as defined in accompanying claims.

What I claim is:

1. In combination with a machine-tool including a frame, work-carrying means and a spindle revoluble with reference to the frame and one end of which carries the work carrying means, the provision of a fluid-operated jack for the control of said work-carrying means comprising an annular piston fitted over the end of the spindle remote from the work carrying means and revolubly carrying said spindle, means preventing said piston from being axially shifted with reference to the spindle, a cylinder surrounding the piston to define at least one chamber therewith, axially shiftable with reference to the spindle and including a section without said chamber extending beyond the last mentioned end of the spindle carrying the piston, a member controlling the position of the work-carrying means and axially rigid with last mentioned section of the cylinder, the last mentioned member being longitudinally slidable with reference to the spindle, and means controlling the admission of operative fluid into and out of the cylinder chamber.

2. In combination with a machine tool including a frame, work-carrying means and a hollow spindle revoluble with reference to the frame and one end of which carries the work carrying means, the provision of a fluid operated jack for the control of said work carrying means comprising an annular piston fitted over the end of the spindle remote from the work carrying means and revolubly carrying said spindle, means preventing said piston from being axially shifted with reference to the spindle, a cylinder surrounding the piston to define at least one chamber therewith, axially shiftable with reference to the spindle and including a section without said chamber extending beyond the last mentioned end of the spindle carrying the piston, a tubular member slidably carried inside the spindle controlling the position of the work-carrying means and axially rigid with last mentioned section of the cylinder, and means controlling the admission of operative fluid into and out of the cylinder chamber.

3. In combination with a machine-tool including a frame, work-carrying means and a spindle revoluble with reference to the frame and one end of which carries the work carrying means, the provision of a fluid-operated jack for the control of said work-carrying means comprising an annular piston fitted over the end of the spindle remote from the work carrying means and revolubly carrying said spindle, means preventing said piston from being axially shifted with reference to the spindle, a cylinder surrounding the piston and forming to either side of said piston a fluidtight compartment therewith, axially shiftable with reference to the spindle and including a section within said chamber extending beyond the last mentioned end of the spindle carrying the piston, means for admitting alternatingly compressed fluid into and exhausting it out of each compartment, and a member controlling the position of the work carrying means axially rigid with said cylinder section, the last mentioned member being longitudinally slidable with reference to the spindle.

4. In combination with a machine-tool including a frame, work-carrying means and a spindle revoluble with reference to the frame and one end of which carries the work-carrying means, the provision of a fluid-operated jack for the control of said work-carrying means comprising an annular piston fitted over the end of the spindle remote from the work carrying means and revolubly carrying said spindle, means preventing said piston from being axially shifted with reference to the spindle, a cylinder surrounding the piston to define at least one chamber therewith, axially shiftable with reference to the spindle and including a section without said chamber extending beyond the last mentioned end of the spindle carrying the piston, a member controlling the position of the work-carrying means and axially rigid with last mentioned section of the cylinder, the last mentioned member being longitudinally slidable with reference to the spindle, a stationary member on the machine tool frame preventing the rotation of the cylinder and on which said cylinder is slidingly mounted, and means controlling the admission of operative fluid into and out of the cylinder chamber.

5. In combination with a machine-tool including a frame, work-carrying means and a spindle revoluble with reference to the frame and one end of which carries the work-carrying means, the provision of a fluid-operated jack for the control of said work carrying means comprising an annular piston fitted over the end of the spindle remote from the work-carrying means and revolubly carrying said spindle, means preventing said piston from being axially shifted with reference to the spindle, a cylinder surrounding the piston to define at least one chamber therewith, axially shiftable with reference to the spindle and including a section without said chamber extending beyond the last mentioned end of the spindle carrying the piston, a member controlling the position of the work-carrying means and axially rigid with last mentioned section of the cylinder, the last mentioned member being longitudinally slidable with reference to the spindle, and means for feeding the cylinder chamber with oil under pressure and for exhausting same out of said compartment at predetermined intervals.

6. In combination with a machine-tool including a frame, work-carrying means and a spindle revoluble with reference to the frame and one end of which carries the work carrying means, the provision of a fluid-operated jack for the control of said work-carrying means comprising an annular piston, frusto-conical bearings for the piston, carried by the spindle to allow the relative rotation of said piston and spindle, a cylinder surrounding the piston forming to either side of said piston a fluidtight compartment therewith, axially shiftable with reference to the piston and including a section extending beyond last mentioned end of the spindle carrying the piston, a member controlling the position of the work carrying means axially rigid with last mentioned section of the cylinder, the last mentioned member being longitudinally slidable with reference to the spindle, a bearing inserted between the cylinder and said member to allow the relative rotation of said cylinder and member, a stationary member on the machine tool frame preventing the rotation of the cylinder and on which said cylinder is slidingly mounted, and oil conveying means for feeding the cylinder compartments with oil under pressure and for exhausting same out of said compartments at predetermined intervals and for lubricating the different bearings with the oil fed to the jack cylinder compartments.

7. In combination with a machine-tool including a frame, work-carrying means and a spindle revoluble with reference to the frame and one end of which carries the work carrying means, the provision of a fluid operated jack for the control of said work-carrying means comprising an annular piston, a frusto-conical bearing for said piston fitted over the end of the spindle remote from the work-carrying means and holding the piston against axial shifting with reference to the spindle, a cylinder surrounding the piston to define at least one chamber therewith, axially shiftable with reference to the piston and including a section extending beyond last mentioned end of the spindle carrying the piston, a member controlling the position of the work-carrying means and axially rigid with last mentioned section of the cylinder, the last mentioned member being longitudinally slidable with reference to the spindle, a bearing inserted between the cylinder and the said member to allow their relative rotation, and means for feeding the cylinder chamber with oil under pressure and for exhausting same out of said chamber at predetermined intervals and including means passing through the piston and connecting the cylinder chamber with the inside of the piston and with the frusto-conical and cylinder bearings, and further means connecting the lower part of the inside of the piston through the cylinder with the outside of the jack.

8. In combination with a machine-tool including a frame, work-carrying means and a spindle revolubly carried in the frame and one end of which carries the work carrying means, the provision of a fluid-operated jack for the control of said work-carrying means comprising an annular piston, bearings for the piston fitted over the end of the spindle remote from the work carrying means and adapted to prevent said piston from being axially shifted with reference to the spindle, a cylinder surrounding the piston to define at least one chamber therewith, axially shiftable with reference to the piston and including a section extending beyond last mentioned end of the spindle carrying the piston, a member controlling the position of the work-carrying means, a bearing inserted between said member and last mentioned section of the cylinder and axially rigid with said member and said section, the last mentioned member being longitudinally slidable with reference to the spindle, means for feeding the cylinder chamber with oil, and adjustable valve-controlled means adapted to feed the different bearings with the oil exhausted from the cylinder chamber.

9. In combination with a machine tool including a frame, work-carrying means and a spindle revoluble with reference to the frame and one end of which carries the work-carrying means, the provision of a fluid-operated jack for the control of said work-carrying means comprising an annular piston, a frusto-conical bearing for the piston fitted over the end of the spindle remote from the work-carrying means and revolubly carrying said spindle, means preventing said piston from being axially shifted with reference to the spindle, a cylinder surrounding the piston and forming to either side of said piston a fluid-tight compartment therewith, axially shiftable with reference to the piston and including a section extending beyond last mentioned end of the spindle carrying the piston, a member controlling the position of the work-carrying means and axially rigid with last mentioned section of the cylinder, the last mentioned member being longitudinally slidable with reference to the spindle, a bearing inserted between the cylinder and said member to allow the relative rotation of said cylinder and member, and means for feeding the cylinder compartments with oil under pressure and for exhausting same out of said compartment at predetermined intervals and for lubricating the different bearings through the oil fed to the jack cylinder including means connecting both compartments of the cylinder with the inside of the piston, two valves controlling the passage through said means out of the corresponding compartment, a common spring urging the two valves simultaneously into their operative passage-closing positions, and means for controlling through the outside of the cylinder the degree of compression of said spring.

10. In combination with a machine-tool including a frame, work-carrying means, a spindle revoluble with reference to the frame and one end of which carries the work-carrying means, the provision of a fluid-operated jack for the control of said work-carrying means comprising an annular piston fitted over the end of the spindle remote from the work-carrying means and revolubly carrying said spindle, means preventing said piston from being axially shifted with reference to the spindle, a cylinder surrounding the piston to define at least one chamber therewith, axially shiftable with reference to the spindle and including a section without said chamber extending beyond the last mentioned end of the spindle carrying the piston, a member controlling the position of the work-carrying means and axially rigid with last mentioned section of the cylinder, the last mentioned member being longitudinally slidable with reference to the spindle, and means controlling the admission of oil into and out of the cylinder chamber, a lubricating pump associated with the machine tool, and means whereby said lubricating pump feeds last-mentioned means with oil.

11. In a machine tool, the combination of work-carrying means, a tubular spindle carrying said work-carrying means, a tubular member slidingly carried inside said spindle for controlling said work-carrying means, a bearing carried by the end of the tubular member opposed to the work-carrying means, a cylinder carried by last mentioned bearing and axially stationary with reference to the said tubular member, two frusto-conical roller bearings flaringly mounted in opposite relationship by the spindle inside said cylinder, a piston having an axial bore assuming the shape of a double frustocone revolubly mounted on said frusto-conical bearings and defining with the inside of the cylinder two operative compartments, means for feeding oil under pressure into and out of said compartments to provide for the reciprocation of the cylinder over the piston and thereby the reciprocation of the tubular control member and for feeding the oil under pressure for lubrication to the frusto-conical roller bearings and the bearing through which the cylinder is carried by the tubular control member.

References Cited in the file of this patent

UNITED STATES PATENTS

| Number | Name | Date |
|---|---|---|
| 2,279,730 | Bradley | Apr. 14, 1942 |
| 2,462,155 | Benjamin et al. | Feb. 22, 1949 |
| 2,546,326 | Wetzel | Mar. 27, 1951 |